(12) United States Patent
Nemoto

(10) Patent No.: US 9,811,719 B2
(45) Date of Patent: Nov. 7, 2017

(54) INFORMATION PROCESSING APPARATUS AND METHOD, AND NON-TRANSITORY COMPUTER READABLE MEDIUM

(71) Applicant: FUJI XEROX CO., LTD., Tokyo (JP)

(72) Inventor: Yoshihiko Nemoto, Yokohama (JP)

(73) Assignee: FUJI XEROX CO., LTD., Tokyo (JP)

( * ) Notice: Subject to any disclaimer, the term of this patent is extended or adjusted under 35 U.S.C. 154(b) by 101 days.

(21) Appl. No.: 14/924,167

(22) Filed: Oct. 27, 2015

(65) Prior Publication Data
US 2016/0342829 A1    Nov. 24, 2016

(30) Foreign Application Priority Data

May 21, 2015 (JP) ................................ 2015-103314

(51) Int. Cl.
*G06K 9/66*  (2006.01)
*G06K 9/00*  (2006.01)
*G11B 27/10*  (2006.01)

(52) U.S. Cl.
CPC ..... *G06K 9/00335* (2013.01); *G06K 9/00718* (2013.01); *G06K 9/00771* (2013.01); *G06K 9/66* (2013.01); *G11B 27/10* (2013.01)

(58) Field of Classification Search
CPC .. G06T 7/20; G06K 9/00335; G06K 9/00718; G06K 9/00771; G06K 9/66
See application file for complete search history.

(56) References Cited

U.S. PATENT DOCUMENTS

| | | | | |
|---|---|---|---|---|
| 3,575,552 A * | 4/1971 | Grant | ...................... | G03B 31/00 352/25 |
| 9,082,018 B1 * | 7/2015 | Laska | ................ | G06K 9/00711 |
| 2006/0093189 A1 * | 5/2006 | Kato | .................. | G06K 9/00335 382/107 |
| 2007/0139569 A1 * | 6/2007 | Matsubayashi | ........ | G06F 3/0346 348/734 |
| 2012/0086864 A1 * | 4/2012 | Williams | ................ | G06F 3/017 348/699 |
| 2014/0169581 A1 * | 6/2014 | Osako | .................... | H04N 9/806 381/73.1 |

(Continued)

FOREIGN PATENT DOCUMENTS

| | | |
|---|---|---|
| JP | 2010-140164 A | 6/2010 |
| JP | 2011-164694 A | 8/2011 |
| JP | 2012-003649 A | 1/2012 |

OTHER PUBLICATIONS

Rainer Stiefelhagen, Jie Yang, and Alex Weibel; "Modeling Focus of Attention for Meeting Indexing Based on Multiple Cues"; IEEE Jul. 2002.*

(Continued)

*Primary Examiner* — Stephen R Koziol
*Assistant Examiner* — Shaghayegh Azima
(74) *Attorney, Agent, or Firm* — Oliff PLC

(57) ABSTRACT

An information processing apparatus includes a receiving unit, a detecting unit, and an associating unit. The receiving unit receives a captured moving image of a target person. The detecting unit detects a cue given by the target person. The associating unit associates the cue, given by the target person and detected by the detecting unit, with the moving image so that the cue will be used to designate the moving image used for evaluating the target person.

9 Claims, 11 Drawing Sheets

(56) References Cited

U.S. PATENT DOCUMENTS

| | | | | |
|---|---|---|---|---|
| 2014/0169626 A1* | 6/2014 | Kim | ................... | G06K 9/00335 |
| | | | | 382/103 |
| 2014/0192206 A1* | 7/2014 | Holz | .................. | H04N 5/23241 |
| | | | | 348/169 |
| 2015/0288883 A1* | 10/2015 | Shigeta | ................... | G06F 3/011 |
| | | | | 345/642 |
| 2016/0275642 A1* | 9/2016 | Abeykoon | ................ | G06T 1/20 |

OTHER PUBLICATIONS

Dinesh Babu Jayagopi, Hayley Hung, Chuohao Yeo, and Daniel Gatica-Perez; "Modeling Dominance in Group Conversations Using Nonverbal Activity Cues"; IEEE, Mar. 2009.*

* cited by examiner

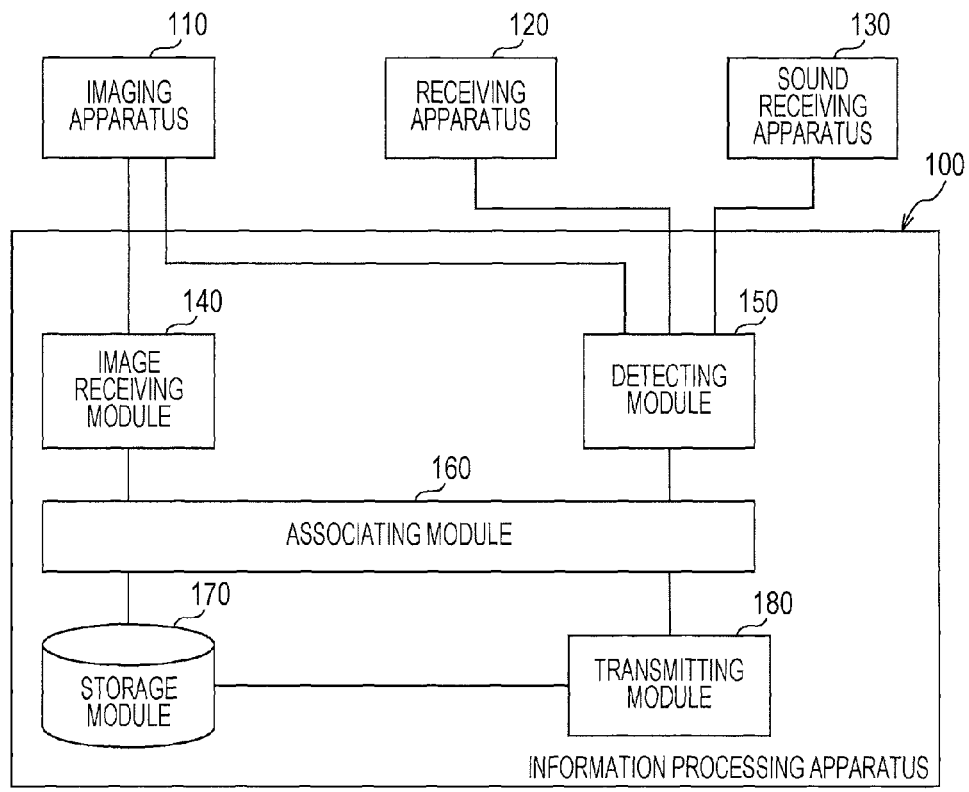
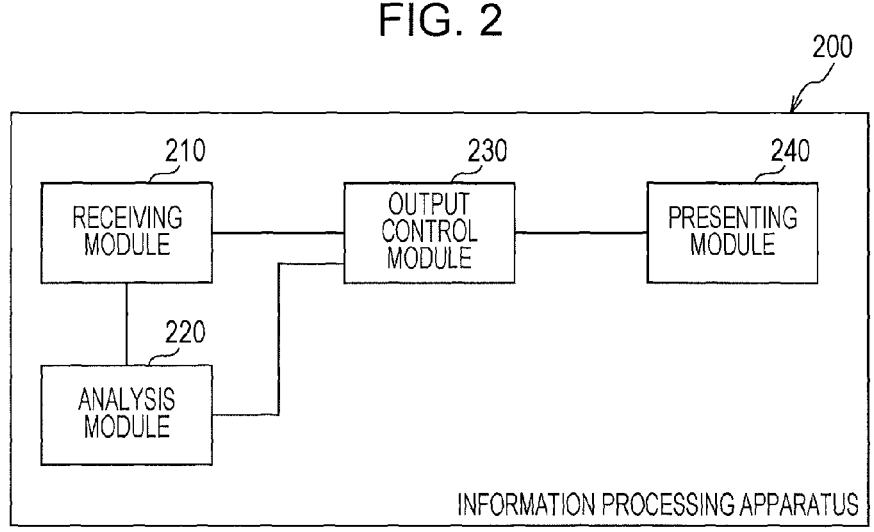

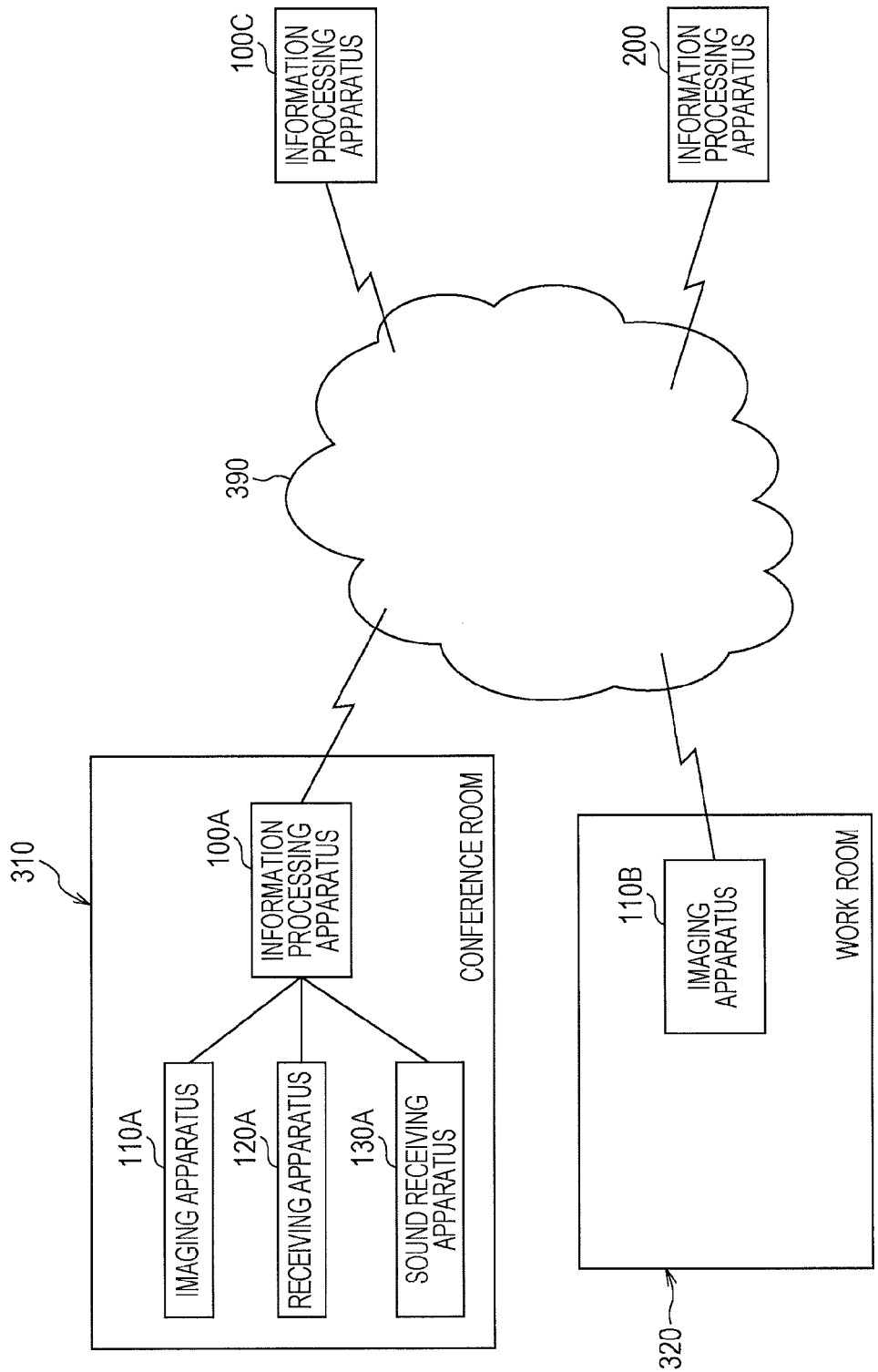

FIG. 13

| USER ID | START CUE | END CUE | PROMPT START CUE | PROMPT END CUE |
|---------|-----------|---------|------------------|----------------|
| 1310 | 1320 | 1330 | 1340 | 1350 1300 |
|  |  |  |  |  |

INFORMATION PROCESSING APPARATUS AND METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2015-103314 filed May 21, 2015.

BACKGROUND (i) Technical Field

The present invention relates to an information processing apparatus and method, and to a non-transitory computer readable medium.

(ii) Related Art

In a work analysis or the like, a moving image of a target person who is doing that work is captured, and, from that moving image, the movement of the target person is evaluated. In such a related art, attention is generally paid to monitoring and recording a movement to be noted or forbidden; thus, this is utilized in reducing inconvenience or checking the occurrence of inconvenience.

However, this work analysis is not utilized in motivating a monitoring target (a worker, for example) by appropriately evaluating how he/she works or makes attempts and efforts. In order to motivate a worker, in many cases, it becomes necessary to monitor and record him/her at all times. It is thus difficult for an evaluator to monitor him/her at all times, and, even with the use of an analysis apparatus, the processing involves vast numbers of images.

SUMMARY

According to an aspect of the invention, there is provided an information processing apparatus including a receiving unit, a detecting unit, and an associating unit. The receiving unit receives a captured moving image of a target person. The detecting unit detects a cue given by the target person. The associating unit associates the cue, given by the target person and detected by the detecting unit, with the moving image so that the cue will be used to designate the moving image used for evaluating the target person.

BRIEF DESCRIPTION OF THE DRAWINGS

Exemplary embodiments of the present invention will be described in detail based on the following figures, wherein:

FIG. 1 is a conceptual module diagram of an exemplary configuration of a first exemplary embodiment (imaging side);

FIG. 2 is a conceptual module diagram of an exemplary configuration of the first exemplary embodiment (analysis side);

FIG. 3 is a diagram illustrating an exemplary system configuration using the exemplary embodiment;

FIG. 13 is a diagram illustrating an exemplary data structure of a cue definition table;

DETAILED DESCRIPTION

Figure 4:
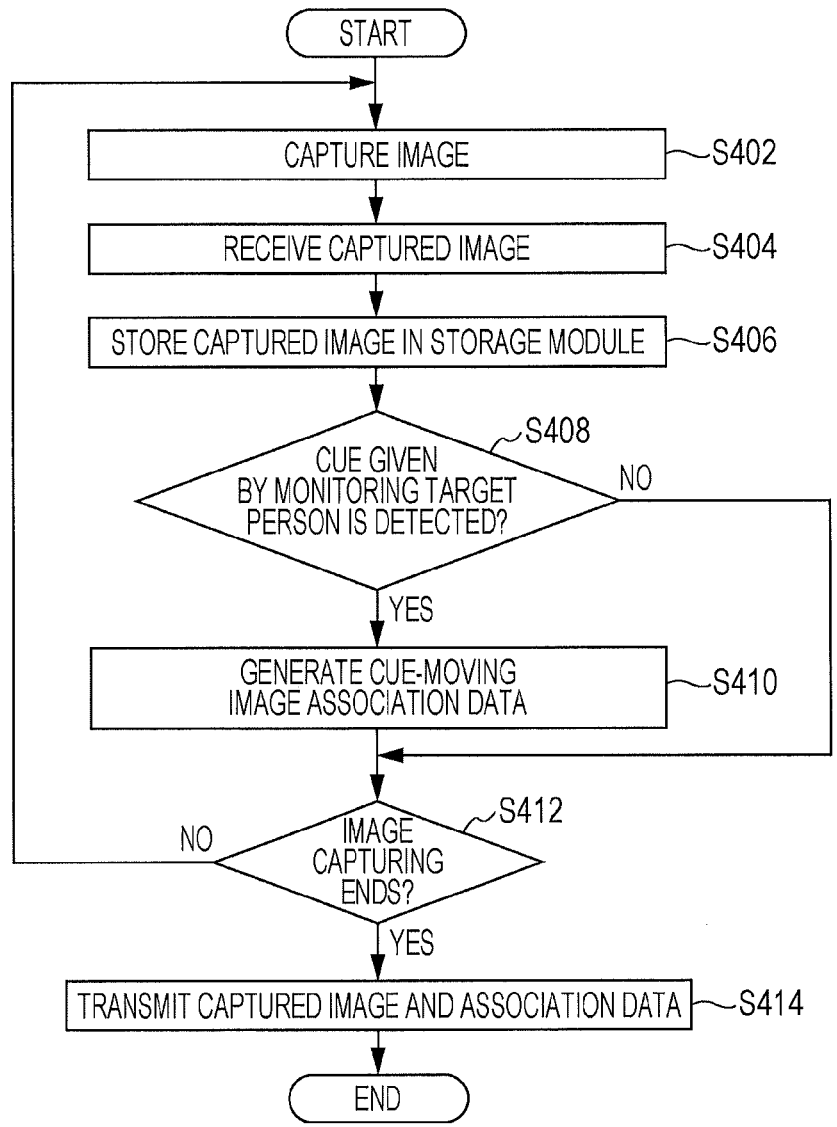
FIG. 4 is a flowchart illustrating an exemplary process according to the first exemplary embodiment.

Hereinafter, various exemplary embodiments of the present invention will be described on the basis of the drawings.

FIG. 1 is a conceptual module diagram of an exemplary configuration of a first exemplary embodiment (imaging side).

Note that the term "module" refers to components such as software (computer programs) and hardware which are typically capable of being logically separated. Consequently, the term "module" in an exemplary embodiment not only refers to modules in a computer program, but also to modules in a hardware configuration. Thus, the exemplary embodiment also serves as a description of a computer program (a program that causes a computer to execute respective operations, a program that causes a computer to function as respective units, or a program that causes a computer to implement respective functions), a system, and a method for inducing functionality as such modules. Note that although terms like "store" and "record" and their equivalents may be used in the description for the sake of convenience, these terms mean that a storage device is made to store information or that control is applied to cause a storage device to store information in the case where the exemplary embodiment is a computer program. Also, while modules may be made to correspond with function on a one-to-one basis, some implementations may be configured such that one program constitutes one module, such that one program constitutes multiple modules, or conversely, such that multiple programs constitute one module. Moreover, multiple modules may be executed by one computer, but one module may also be executed by multiple computers in a distributed or parallel computing environment. Note that a single module may also contain other modules. Also, the term "connection" may be used hereinafter to denote logical connections (such as the transfer of data and referential relationships between instructions and data) in addition to physical connections. The term "predetermined" refers to something being determined prior to the processing in question, and obviously denotes something that is determined before a process according to the exemplary embodiment starts, but may also denote something that is determined after a process according to the exemplary embodiment has started but before the processing in question, according to conditions or states at that time, or according to conditions or states up to that time. In the case of multiple "predetermined values", the predetermined values may be respectively different values, or two or more values (this obviously also includes the case of all values) which are the same. Additionally, statements to the effect of "B is conducted in the case of A" are used to denote that a determination is made regarding whether or not A holds true, and B is conducted in the case where it is determined that A holds true. However, this excludes cases where the determination of whether or not A holds true may be omitted.

Also, the terms "system", "device", and "apparatus" not only encompass configurations in which multiple computers, hardware, or devices are connected by a communication medium such as a network (including connections that support 1-to-1 communication), but also encompass configurations implemented by a single computer, hardware, or device. The terms "system", "device", and "apparatus" are used interchangeably. Obviously, the term "system" does not include merely artificially arranged social constructs (social systems).

Also, every time a process is conducted by each module or every time multiple processes are conducted within a module, information to be processed is retrieved from a storage device, and the processing results are written back to the storage device after the processing. Consequently, description of the retrieval from a storage device before processing and the writing back to a storage device after processing may be reduced or omitted in some cases. Note that the storage device herein may include hard disks, random access memory (RAM), an auxiliary or external storage medium, a storage device accessed via a communication link, and registers, etc. inside a central processing unit (CPU).

An information processing apparatus 100 (imaging side) according to the first exemplary embodiment is configured to capture an image of a target person that is a person to be evaluated. As illustrated in FIG. 1, the information processing apparatus 100 includes an image receiving module 140, a detecting module 150, an associating module 160, a storage module 170, and a transmitting module 180.

A target person who is subjected to image capturing is a person whose movement is a target to be evaluated, and includes a worker at a factory, a construction site, or the like, a driver who drives a bus, a train, a taxi, or the like, a participant of a conference, a guide such as a receptionist, a salesperson, a clerk, or the like.

A cue given by a target person is given immediately before he/she performs a movement (including a sound) that he/she wants to be evaluated. Alternatively, a cue may be given after a target person performs a movement that he/she wants to be evaluated, as will be described later.

An imaging apparatus 110 is connected to the image receiving module 140 and the detecting module 150 of the information processing apparatus 100. The imaging apparatus 110 captures an image of a target person. The imaging apparatus 110 is, for example, a two-dimensional camera, a three-dimensional camera, a thermo-camera, or an omnidirectional camera for capturing a moving image. The imaging apparatus 110 may be one that is fixed or one whose angle or position is movable. Besides capturing a moving image for evaluation, the imaging apparatus 110 may capture a cue given by a target person.

A receiving apparatus 120 is connected to the detecting module 150 of the information processing apparatus 100. The receiving apparatus 120 receives an instruction from a terminal device operated by a target person. The receiving apparatus 120 is, for example, a near-field communication apparatus with the Bluetooth function. Communication with a terminal device operated by a target person may be wired, wireless, or a combination of both. A terminal device to be operated by a target person includes a personal computer (PC) and a mobile terminal (including a mobile phone and a smart phone) with a communication function, and a wearable communication apparatus.

A sound receiving apparatus 130 is connected to the detecting module 150 of the information processing apparatus 100. The sound receiving apparatus 130 is a microphone that obtains a sound generated by a target person. In the case where this sound is a predetermined sound, this serves as a cue given by the target person.

Note that the receiving apparatus 120 and the sound receiving apparatus 130 need not be connected to the information processing apparatus 100. In other words, there are cases in which the receiving apparatus 120 and the sound receiving apparatus 130 are not connected to the information processing apparatus 100 (the case where a cue given by a target person is a movement), one of the receiving apparatus 120 and the sound receiving apparatus 130 is connected to the information processing apparatus 100 (generally, one of the case where a cue given by a target person is an instruction from a terminal device, and the case where a cue given by a target person is a sound, or the case where a cue is given in one of the foregoing cases and by a movement of the target person), and both the receiving apparatus 120 and the sound receiving apparatus 130 are connected to the information processing apparatus 100 (generally, the case where a cue given by a target person is a combination of an instruction from a terminal device and a sound, and further this combination includes a movement of the target person).

The image receiving module 140 is connected to the imaging apparatus 110 and the associating module 160. The image receiving module 140 receives a captured moving image of a target person from the imaging apparatus 110. The moving image received here is a constantly-captured moving image. Note that the moving image may not necessarily include the target person at all times, and may include a period where the target person is not included since he/she temporarily leaves his/her seat, for example.

The detecting module 150 is connected to the imaging apparatus 110, the receiving apparatus 120, the sound receiving apparatus 130, and the associating module 160. The detecting module 150 detects a cue given by a target person. The cue here includes a start cue and an end cue. Note that a cue given by a target person may be only a start cue or an end cue, as will be described later. In the case of only a start cue (B), this start cue (B) may be different from a start cue (A) in the case where there are both a start cue (A) and an end cue. Similarly, in the case of only an end cue (B), this end cue (B) may be different from an end cue (A) in the case where there are both a start cue and an end cue (A).

In addition, the detecting module 150 may detect one or a combination of an instruction from a terminal device operated by a target person as a cue, a predetermined sound generated by a target person as a cue, and a predetermined movement of a target person as a cue. The detecting module 150 detects whether a predetermined cue is included in a moving image captured by the imaging apparatus 110. This detection here may be done using the related art of moving image analysis. The detecting module 150 also detects whether information indicating a predetermined cue is included in information received by the receiving apparatus 120. The detecting module 150 also detects whether a predetermined cue is included in sound information received by the sound receiving apparatus 130. This detection here may be done using the related art of sound recognition.

In addition, in response to detection of one of the start and the end as the cue (one of the above-described start cue (B) and the end cue (B)), if the cue indicates the start, the detecting module 150 may treat a point after a predetermined period after the start as the end, and, if the cue indicates the end, the detecting module 150 may treat a point before a predetermined period before the end as the start.

The associating module 160 is connected to the image receiving module 140, the detecting module 150, the storage module 170, and the transmitting module 180. The associating module 160 associates a cue given by a target person, which is detected by the detecting module 150, so as to be used to designate a moving image used for evaluating the target person.

In addition, the associating module 160 may extract a moving image between the start and the end in accordance with cues, or may associate the start date and time and the end date and time (may be year, month, day, hour, second, microsecond, or a combination thereof) with the moving image. The date and time includes, besides an absolute date and time (date and time indicated by calendar), a relative date and time after the start of image capturing. Specifically, an extracted image may be stored in a storage device or may be transmitted to a person (evaluator) who evaluates the target person.

The storage module 170 is connected to the associating module 160 and the transmitting module 180. The storage module 170 stores a moving image (including a moving image between the start and the end) with which the start date and time and the end date time are associated by the associating module 160.

The transmitting module 180 is connected to the associating module 160 and the storage module 170. The transmitting module 180 transmits a moving image stored in the storage module 170, or a moving image with which the start date and time and the end date time are associated by the associating module 160, to an information processing apparatus 200.

The information processing apparatus 200 (analysis side) according to the first exemplary embodiment is configured to reproduce a captured moving image of a target person for an evaluator. As in the example illustrated in FIG. 2, the information processing apparatus 200 includes a receiving module 210, an analysis module 220, an output control module 230, and a presenting module 240.

The receiving module 210 is connected to the analysis module 220 and the output control module 230. The receiving module 210 is connected to the information processing apparatus 100 and receives a captured moving image of a target person from the transmitting module 180 of the information processing apparatus 100.

The analysis module 220 is connected to the receiving module 210 and the output control module 230. The analysis module 220 analyzes a moving image received by the receiving module 210. The analysis processing here may be done using the related art of moving image analysis. For example, whether a target person has done a predetermined movement (such as a movement in a standard step) is determined.

The output control module 230 is connected to the receiving module 210, the analysis module 220, and the presenting module 240. The output control module 230 performs control to reproduce a moving image between the start and the end in accordance with cues, performs control to regard that moving image as a target to be analyzed, or performs control to perform both thereof.

The presenting module 240 is connected to the output control module 230. Under control of the output control module 230, the presenting module 240 presents a moving image on an output device such as a liquid crystal display so that the evaluator becomes able to evaluate the moving image.

FIG. 3 is a diagram illustrating an exemplary system configuration using the exemplary embodiment.

An information processing apparatus 100A, an imaging apparatus 110B, an information processing apparatus 100C, and the information processing apparatus 200 are connected to one another via a communication link 390. In particular, the information processing apparatus 100A is connected to the information processing apparatus 200, the imaging apparatus 110B is connected to the information processing apparatus 100C, and the information processing apparatus 100C is connected to the information processing apparatus 200. The communication link 390 may be wireless, wired, or a combination of both. For example, the communication link 390 may be the Internet, an intranet, or the like serving as a communication infrastructure. The information processing apparatus 200 is operated by the evaluator.

The information processing apparatus 100A, an imaging apparatus 110A, a receiving apparatus 120A, and a sound receiving apparatus 130A are located in a conference room 310. The imaging apparatus 110A is connected to the information processing apparatus 100A. The receiving apparatus 120A is connected to the information processing apparatus 100A. The sound receiving apparatus 130A is connected to the information processing apparatus 100A. This is for evaluation of conference participants in the conference room 310. In this case, a cue is a movement or sound of a target person, an instruction from a terminal device, or a combination of both.

The imaging apparatus 110B is located in a work room 320. This is for evaluation of a worker in the work room 320. In this case, a cue is given as a movement of a target person. The information processing apparatus 100C associates a moving image with a cue. Note that the functions of the information processing apparatus 100C may be implemented as a cloud service.

Although the example illustrated in FIG. 3 illustrates two forms (the case where the information processing apparatus 100A is located in the conference room 310; and the case where the information processing apparatus 100 is not located in the work room 320, and the information processing apparatus 100C connected to the communication link 390 is used), the receiving apparatus 120 and the sound receiving apparatus 130 may be located in the work room 320, or the information processing apparatus 100C may be connected to multiple imaging apparatuses 110 located at multiple places.

FIG. 4 is a flowchart illustrating an exemplary process according to the first exemplary embodiment (information processing apparatus 100).

In step S402, the imaging apparatus 110 captures an image of a target person.

In step S404, the image receiving module 140 receives the captured image.

In step S406, the associating module 160 stores the moving image in the storage module 170.

Figure 5:
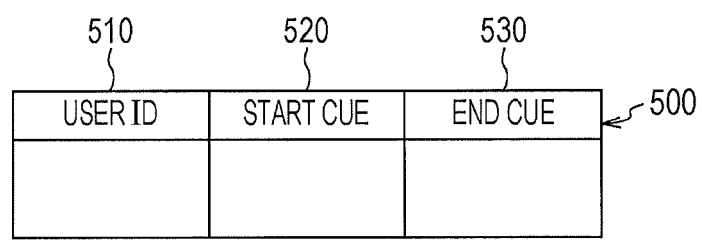
FIG. 5 is a diagram illustrating an exemplary data structure of a cue definition table.

In step S408, the detecting module 150 determines whether a cue given by the target person being monitored has been detected. In the case where a cue has been detected, the process proceeds to step S410; otherwise, the process proceeds to step S412. The detection processing here simply determines whether a cue given by the target person matches a predetermined cue. For example, a cue definition table 500 may be used as a predetermined cue. FIG. 5 is a diagram illustrating an exemplary data structure of the cue definition table 500. The cue definition table 500 includes a user identification (ID) column 510, a start cue column 520, and an end cue column 530. The user ID column 510 stores information for uniquely identifying a user (target person) in the exemplary embodiment. The start cue column 520 stores a start cue of that user. The end cue column 530 stores an end cue of that user. For example, in the case where a cue is a movement (raising a finger, waving a hand, or the like), the cue definition table 500 may include a moving image of that movement, or a feature for recognizing that movement. In addition, in the case where a cue is an instruction from a terminal device (a start instruction or an end instruction), the cue definition table 500 includes information indicating that instruction. In the case where a cue is a sound (a sound such as "start", "end", or the like), the cue definition table 500 may include information recording that sound, or a feature for recognizing that sound. In addition, a start cue and an end cue need not be different. Two cues may serve as an end cue. In addition, although the user ID column 510 is prepared to handle different cues for different users, the same cue may be defined for all users. In addition, the user ID column 510 may be used to identify a user in accordance with a cue. In short, a user may be identified without pre-registering a user who is a target subjected to image capturing before capturing an image.

Figure 6:
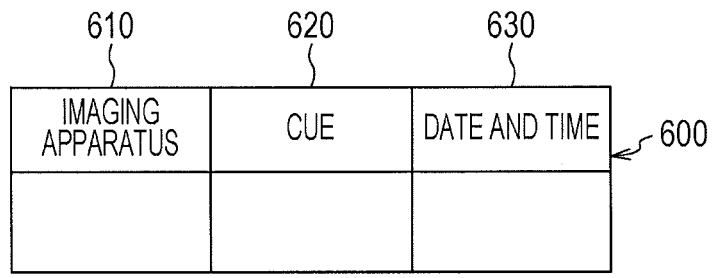
FIG. 6 is a diagram illustrating an exemplary data structure of an association table.

In step S410, the associating module 160 generates cue-moving image association data. For example, the associating module 160 generates an association table 600. FIG. 6 is a diagram illustrating an exemplary data structure of the association table 600.

The association table 600 includes an imaging apparatus column 610, a cue column 620, and a date and time column 630.

The imaging apparatus column 610 stores information for uniquely identifying an imaging apparatus in the exemplary embodiment. The cue column 620 stores cue information on a cue given by a target person (information indicating a start cue and an end cue). The date and time column 630 stores a date and time at which a cue has been given. By using the association table 600, it becomes possible to reproduce a moving image from when a start cue is given to when an end cue is given.

In step S412, it is determined whether the image capturing ends. In the case where the image capturing ends, the process proceeds to step S414; otherwise, the process returns to step S402.

In step S414, the transmitting module 180 transmits the captured image and the association data to the information processing apparatus 200.

Figure 7:
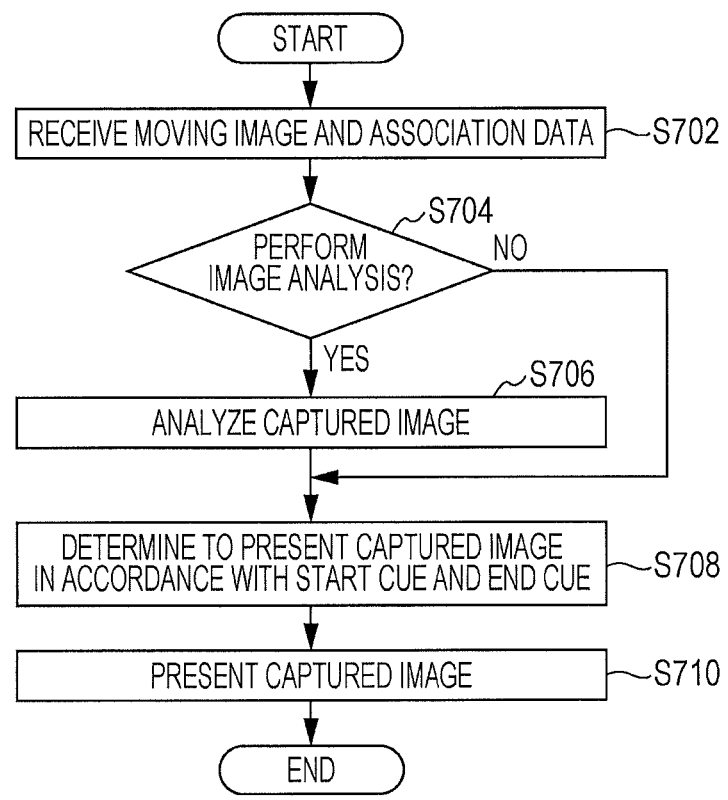
FIG. 7 is a flowchart illustrating an exemplary process according to the first exemplary embodiment.

FIG. 7 is a flowchart illustrating an exemplary process according to the first exemplary embodiment (information processing apparatus 200).

In step S702, the receiving module 210 receives a captured image and association data.

In step S704, the analysis module 220 determines whether to perform image analysis, and, in the case of performing image analysis, the process proceeds to step S706; otherwise, the process proceeds to step S708.

In step S706, the analysis module 220 analyzes the captured image.

In step S708, the output control module 230 determines to present a captured image in accordance with a start cue and an end cue. In other words, the output control module 230 performs control to reproduce a captured image from a start cue to an end cue. If cues are different for each user, the output control module 230 may perform control to reproduce a captured image of a user designated by the evaluator.

In step S710, the presenting module 240 presents the captured image.

Figure 8:
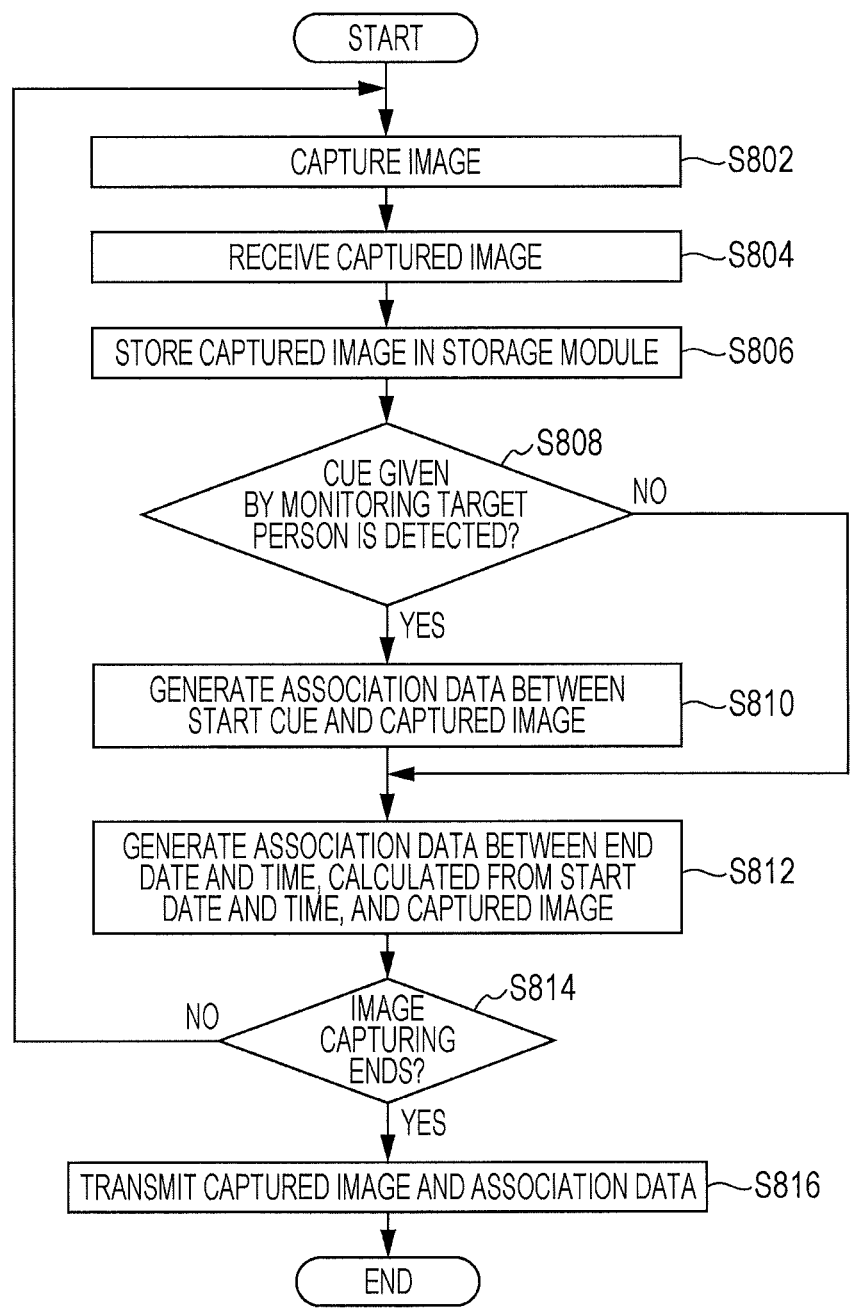
FIG. 8 is a flowchart illustrating an exemplary process according to the first exemplary embodiment.

FIG. 8 is a flowchart illustrating an exemplary process according to the first exemplary embodiment (information processing apparatus 100). This illustrates an exemplary process in the case where only a start cue has been detected.

In step S802, the imaging apparatus 110 captures an image of a target person.

In step S804, the image receiving module 140 receives the captured image.

In step S806, the associating module 160 stores the captured image in the storage module 170.

In step S808, the detecting module 150 determines whether a start cue given by the target person being monitored has been detected. In the case where a start cue has been detected, the process proceeds to step S810; otherwise, the process proceeds to step S812. Detection of a start cue is done using the cue definition table 500. However, the end cue column 530 in the cue definition table 500 is unnecessary.

In step S810, the associating module 160 generates association data between the start cue and the captured image.

In step S812, the associating module 160 generates association data between an end date and time, which is calculated from a start date and time, and the captured image. Calculation of an end date and time may be done by adding a predetermined period to a start date and time.

In step S814, it is determined whether the image capturing ends. In the case where the image capturing ends, the process proceeds to step S816; otherwise, the process returns to step S802.

In step S816, the transmitting module 180 transmits the captured image and the association data to the information processing apparatus 200.

Figure 9:
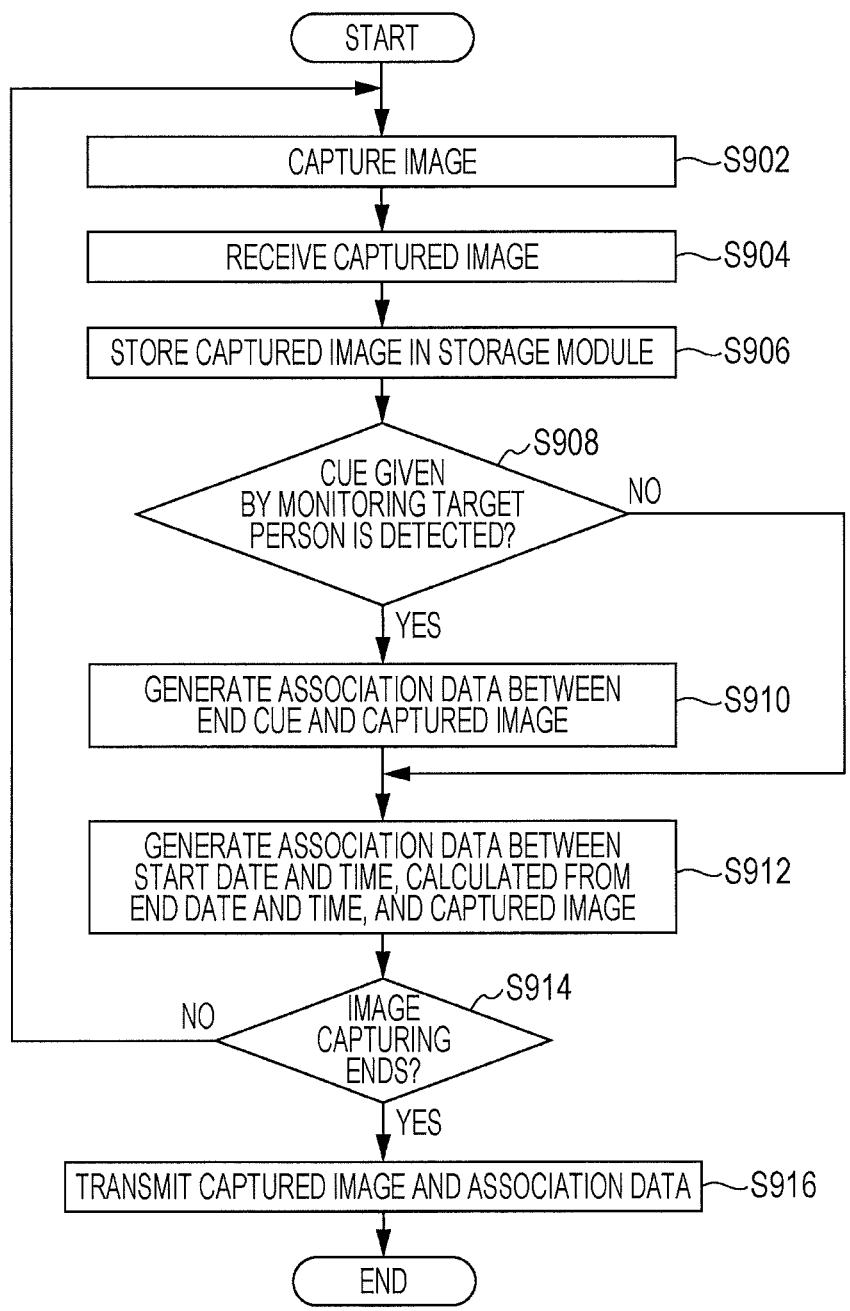
FIG. 9 is a flowchart illustrating an exemplary process according to the first exemplary embodiment.

FIG. 9 is a flowchart illustrating an exemplary process according to the first exemplary embodiment (information processing apparatus 100). This illustrates an exemplary process in the case where only an end cue has been detected.

In step S902, the imaging apparatus 110 captures an image of a target person.

In step S904, the image receiving module 140 receives the captured image.

In step S906, the associating module 160 stores the captured image in the storage module 170.

In step S908, the detecting module 150 determines whether an end cue given by the target person being monitored has been detected. In the case where an end cue has been detected, the process proceeds to step S910; otherwise, the process proceeds to step S912. Detection of an end cue is done using the cue definition table 500. However, the start cue column 520 in the cue definition table 500 is unnecessary.

In step S910, the associating module 160 generates association data between the end cue and the captured image.

In step S912, the associating module 160 generates association data between a start date and time, which is calculated from an end date and time, and the captured image. Calculation of a start date and time may be done by subtracting a predetermined period from an end date and time.

In step S914, it is determined whether the image capturing ends. In the case where the image capturing ends, the process proceeds to step S916; otherwise, the process returns to step S902.

In step S916, the transmitting module 180 transmits the captured image and the association data to the information processing apparatus 200.

Figure 10:
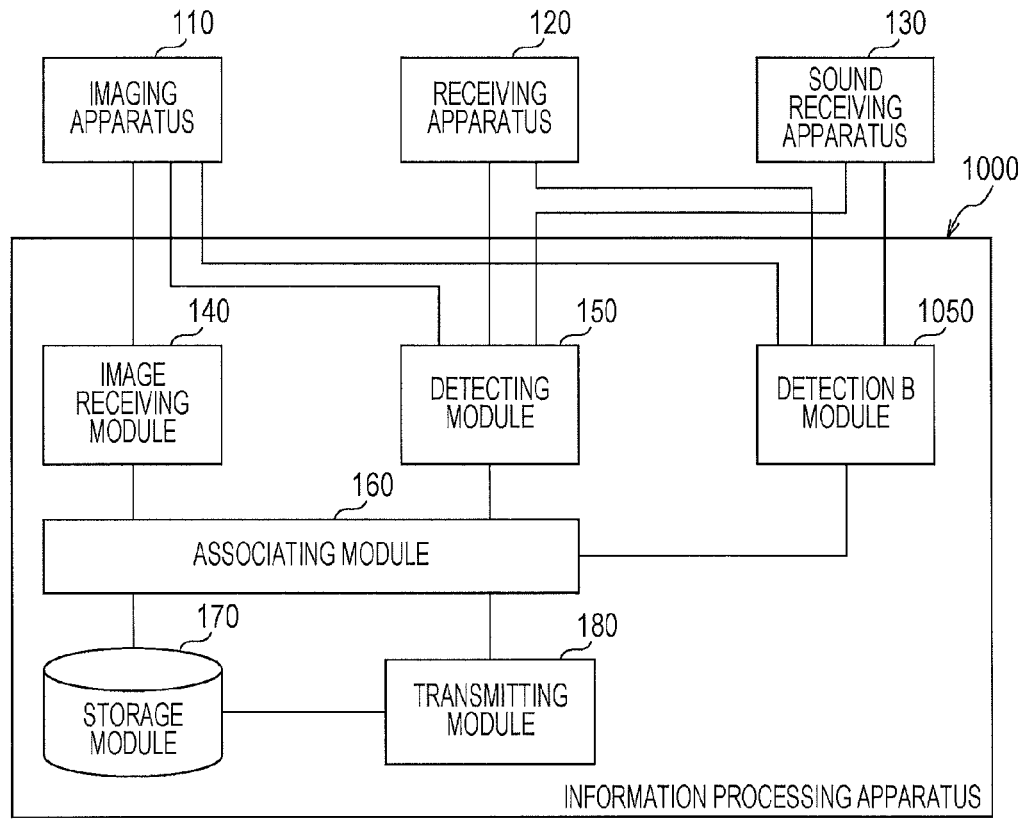
FIG. 10 is a conceptual module diagram of an exemplary configuration of a second exemplary embodiment (imaging side)

FIG. 10 is a conceptual module diagram according to a second exemplary embodiment (imaging side).

An information processing apparatus 1000 includes the image receiving module 140, the detecting module 150, a detection B module 1050, the associating module 160, the storage module 170, and the transmitting module 180. Note that the same reference numerals are given to components of the same type as the first exemplary embodiment, and overlapping descriptions will be omitted (the same applies hereinafter).

The information processing apparatus 1000 is configured to handle a second cue. Here, the second cue is a cue for requesting the evaluator to perform evaluation in real time (the term "real time" here may include some delay). For example, a target person is not confident in his/her movement and is seeking prompt advice from the evaluator. In response to detection of a second cue, a captured image after the second cue is presented to the evaluator in real time.

The imaging apparatus 110 is connected to the image receiving module 140, the detecting module 150, and the detection B module 1050 of the information processing apparatus 1000.

The receiving apparatus 120 is connected to the detecting module 150 and the detection B module 1050 of the information processing apparatus 1000.

The sound receiving apparatus 130 is connected to the detecting module 150 and the detection B module 1050 of the information processing apparatus 1000.

The image receiving module 140 is connected to the imaging apparatus 110 and the associating module 160.

The detecting module 150 is connected to the imaging apparatus 110, the receiving apparatus 120, the sound receiving apparatus 130, and the associating module 160.

The detection B module 1050 is connected to the imaging apparatus 110, the receiving apparatus 120, the sound receiving apparatus 130, and the associating module 160. The detection B module 1050 detects a second cue given by a target person.

The associating module 160 is connected to the image receiving module 140, the detecting module 150, the detection B module 1050, the storage module 170, and the transmitting module 180. In response to detection of a second cue by the detection B module 1050, the associating module 160 associates the second cue with a moving image.

The storage module 170 is connected to the associating module 160 and the transmitting module 180.

The transmitting module 180 is connected to the associating module 160 and the storage module 170. In response to detection of a second cue by the detection B module 1050, the transmitting module 180 promptly transmits information indicating that there has been the second cue, and a moving image after the second cue to an information processing apparatus 1100.

Figure 11:
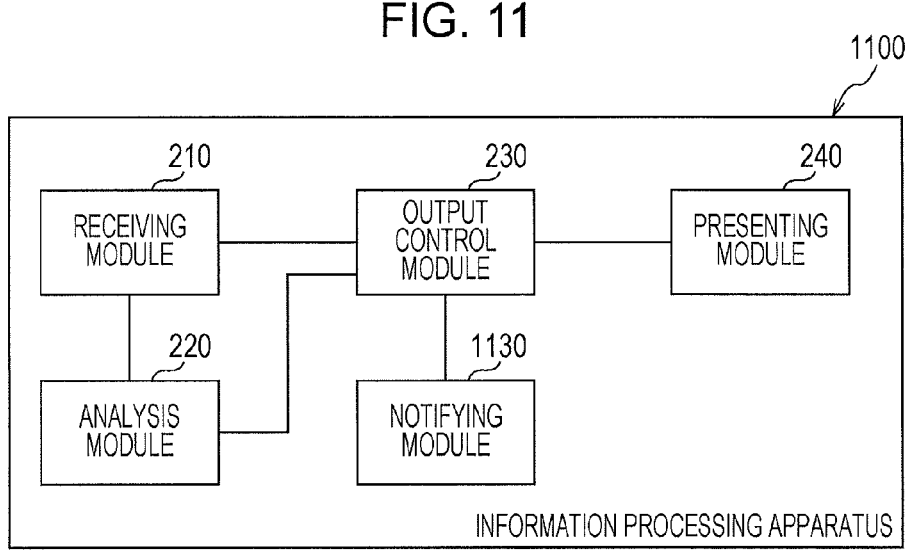
FIG. 11 is a conceptual module diagram of an exemplary configuration of the second exemplary embodiment (analysis side)

FIG. 11 is a conceptual module diagram of an exemplary configuration according to the second exemplary embodiment (analysis side).

The information processing apparatus 1100 includes the receiving module 210, the analysis module 220, the output control module 230, a notifying module 1130, and the presenting module 240.

The receiving module 210 is connected to the analysis module 220 and the output control module 230.

The analysis module 220 is connected to the receiving module 210 and the output control module 230.

The output control module 230 is connected to the receiving module 210, the analysis module 220, the notifying module 1130, and the presenting module 240.

The notifying module 1130 is connected to the output control module 230. In response to detection of a second cue (this includes detecting the fact that a second cue is included in information received by the receiving module 210), the notifying module 1130 notifies the evaluator so as to present a moving image after the second cue to the evaluator. For example, the notifying module 1130 notifies a PC, a mobile terminal, a wearable communication device, or the like that the evaluator uses, of the fact that a second cue has been given by a target person, or presents a moving image where a second cue has been given. This may be done by displaying the notification on a liquid crystal display or the like, by using a sound or vibration, or by using a combination thereof. Furthermore, a table storing the association between a target person and an evaluator may be prepared, and an evaluator that suits a target person may be selected.

The presenting module 240 is connected to the output control module 230.

Figure 12:
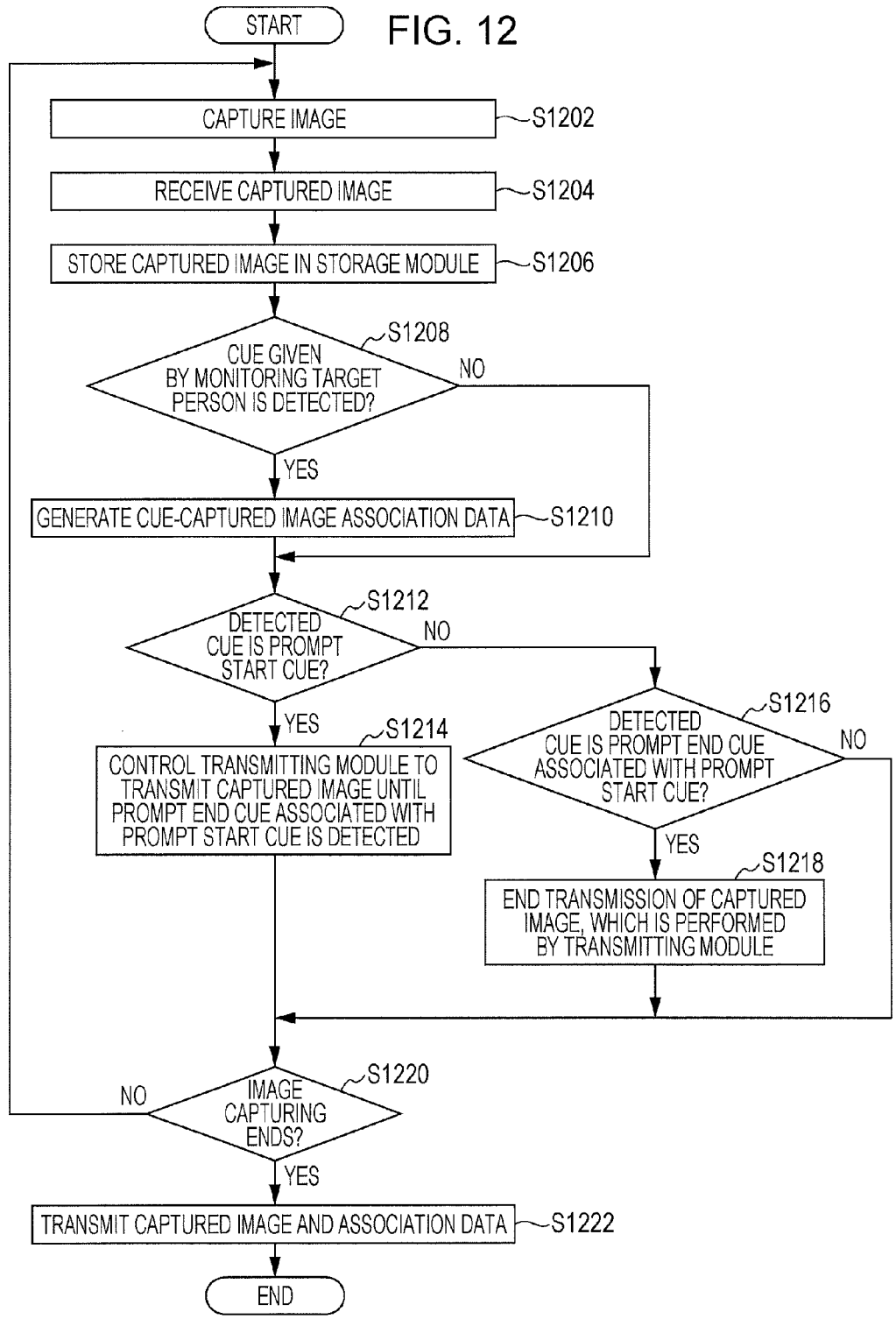
FIG. 12 is a flowchart illustrating an exemplary process according to the second exemplary embodiment.

FIG. 12 is a flowchart illustrating an exemplary process according to the second exemplary embodiment (information processing apparatus 1000).

In step S1202, the imaging apparatus 110 captures an image of a target person.

In step S1204, the image receiving module 140 receives the captured image.

In step S1206, the associating module 160 stores the captured image in the storage module 170.

In step S1208, the detecting module 150 or the detection B module 1050 determines whether a cue given by the monitoring target person has been detected. In the case where a cue has been detected, the process proceeds to step S1210; otherwise, the process proceeds to step S1212. The detection processing here simply determines whether a cue given by the target person matches a predetermined cue. For example, a cue definition table 1300 may be used as a predetermined cue. FIG. 13 is a diagram illustrating an exemplary data structure of the cue definition table 1300. The cue definition table 1300 includes a user ID column 1310, a start cue column 1320, an end cue column 1330, a prompt start cue column 1340, and a prompt end cue column 1350. The user ID column 1310 stores a use ID. The start cue column 1320 stores a start cue of that user. The end cue column 1330 stores an end cue of that user. The prompt start cue column 1340 stores a prompt start cue (second cue) of that user. The prompt end cue column 1350 stores a prompt end cue (an end cue associated with the second cue) of that user.

In step S1210, the associating module 160 generates cue-moving image association data.

In step S1212, the associating module 160 determines whether the detected cue is a prompt start cue. In the case where the detected cue is a prompt start cue, the process proceeds to step S1214; otherwise, the process proceeds to step S1216.

In step S1214, the associating module 160 controls the transmitting module 180 to transmit a captured image until a prompt end cue associated with the prompt start cue is detected.

In step S1216, the associating module 160 determines whether the detected cue is a prompt end cue associated with the prompt start cue. In the case where the detected cue is a prompt end cue associated with the prompt start cue, the process proceeds to step S1218; otherwise, the process proceeds to step S1220.

In step S1218, the associating module 160 ends transmission of the captured image, which is performed by the transmitting module 180.

In step S1220, it is determined whether the image capturing ends. In the case where the image capturing ends, the process proceeds to step S1222; otherwise, the process returns to step S1202.

In step S1222, the transmitting module 180 transmits the captured image and the association data to the information processing apparatus 1100.

Figure 14:
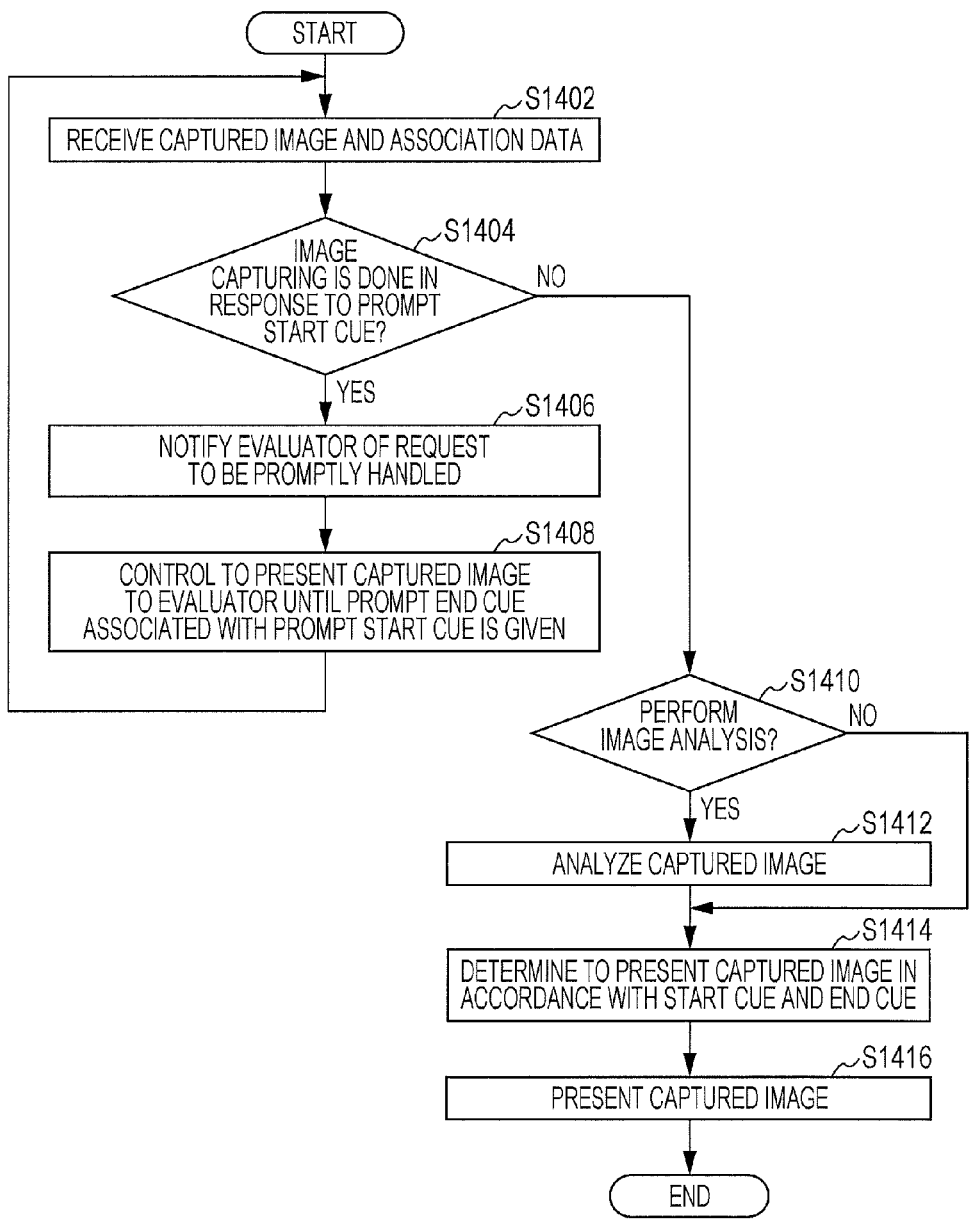
FIG. 14 is a flowchart illustrating an exemplary process according to the second exemplary embodiment.

FIG. 14 is a flowchart illustrating an exemplary process according to the second exemplary embodiment (information processing apparatus 1100).

In step S1402, the receiving module 210 receives a captured image and association data.

In step S1404, the output control module 230 determines whether the captured image is one that has been captured in response to a prompt start cue. In the case where the captured image is one that has been captured in response to a prompt start cue, the process proceeds to step S1406; otherwise, the process proceeds to step S1410.

In step S1406, the notifying module 1130 notifies the evaluator of the fact that there is a request to be promptly handled.

In step S1408, control is performed to present a captured image to the evaluator until a prompt end cue associated with the prompt start cue is given.

In step S1410, the analysis module 220 determines whether to perform image analysis, and, in the case of performing image analysis, the proceeds to step S1412; otherwise, the process proceeds to step S1414.

In step S1412, the analysis module 220 analyzes the captured image.

In step S1414, the output control module 230 determines to present a captured image in accordance with the start cue and the end cue.

In step S1416, the presenting module 240 presents the captured image.

Figure 15:
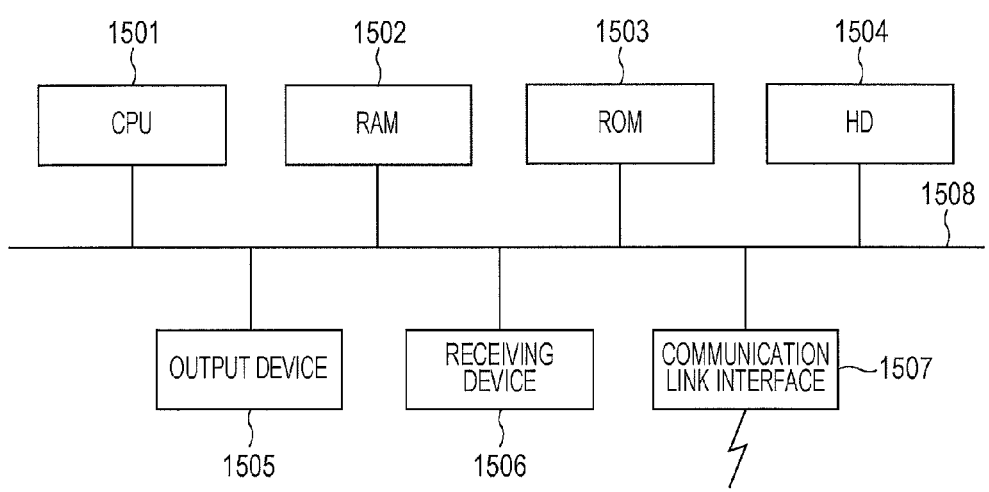
FIG. 15 is a block diagram illustrating an exemplary hardware configuration of a computer implementing the exemplary embodiment.

Note that a hardware configuration of a computer executing a program that acts as the present exemplary embodiment is a general computer as illustrated by the example of FIG. 15, and specifically is a computer or the like that may be a personal computer or a server. In other words, as a specific example, a CPU 1501 is used as a processing unit (computational unit), while RAM 1502, ROM 1503, and an HD 1504 are used as storage devices. For the HD 1504, a hard disk or solid state drive (SSD) may be used, for example. The computer is made up of the CPU 1501 that executes programs such as the image receiving module 140, the detecting module 150, the associating module 160, the transmitting module 180, the receiving module 210, the analysis module 220, the output control module 230, the presenting module 240, the detection B module 1050, and the notifying module 1130, the RAM 1502 that stores such programs and data, the ROM 1503 that stores programs and the like for activating the computer, the HD 1504 which is an auxiliary storage device (and which may be flash memory or the like), a receiving device 1506 that receives data on the basis of user operations with respect to a keyboard, mouse, touchscreen, microphone, or the like, an output device 1505 such as a CRT or liquid crystal display, a communication link interface 1507 such as a network interface card for connecting to a communication network, and a bus 1508 for joining and exchanging data with the above components. Multiple such computers may also be connected to each other by a network.

Of the foregoing exemplary embodiments, for those made up of a computer program, software in the form of a computer program is made to be read into a system with the above hardware configuration, and the foregoing exemplary embodiment is implemented by the cooperative action of the software and hardware resources.

Note that the hardware configuration illustrated in FIG. 15 illustrates a single exemplary configuration, and that the exemplary embodiment is not limited to the configuration illustrated in FIG. 15 insofar as the configuration still enables execution of the modules described in the exemplary embodiment. For example, some modules may also be implemented with special-purpose hardware (such as an application specific integrated circuit (ASIC), for example), and some modules may be configured to reside within an external system and be connected via a communication link. Furthermore, it may also be configured such that multiple instances of the system illustrated in FIG. 15 are connected to each other by a communication link and operate in conjunction with each other. Additionally, besides a personal computer in particular, an exemplary embodiment may also be incorporated into a mobile info communication device (including a mobile phone, smart phone, mobile device, and wearable computer), information appliance, robot, photocopier, fax machine, scanner, printer, or multi-function device (that is, an image processing device having two or more from among scanning, printing, copying, and faxing functions).

Note that the described program may be provided stored in a recording medium, but the program may also be provided via a communication medium. In this case, a "computer-readable recording medium storing a program", for example, may also be taken to be an exemplary embodiment of the present invention with respect to the described program.

A "computer-readable recording medium storing a program" refers to a computer-readable recording medium upon which a program is recorded, and which is used in order to install, execute, and distribute the program, for example.

Potential examples of a recording medium include a Digital Versatile Disc (DVD), encompassing formats such as "DVD-R, DVD-RW, and DVD-RAM" defined by the DVD Forum and formats such as "DVD+R and DVD+RW" defined by DVD+RW Alliance, a compact disc (CD), encompassing formats such as read-only memory (CD-ROM), CD Recordable (CD-R), and CD Rewritable (CD-RW), a Blu-ray Disc (registered trademark), a magneto-optical (MO) disc, a flexible disk (FD), magnetic tape, a hard disk, read-only memory (ROM), electrically erasable and programmable read-only memory (EEPROM (registered trademark)), flash memory, random access memory (RAM), and a Secure Digital (SD) memory card.

In addition, all or part of the above program may also be recorded to the recording medium and saved or distributed, for example. Also, all or part of the above program may be communicated by being transmitted using a transmission medium such as a wired or wireless communication network used in a local area network (LAN), a metropolitan area network (MAN), a wide area network (WAN), the Internet, an intranet, an extranet, or some combination thereof, or alternatively, by being impressed onto a carrier wave and propagated.

Furthermore, the above program may be part of another program, and may also be recorded to a recording medium together with other separate programs. The above program may also be recorded in a split manner across multiple recording media. The above program may also be recorded in a compressed, encrypted, or any other recoverable form.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various exemplary embodiments and with the various modifications as are suited to the particular use contemplated. It is intended that the scope of the invention be defined by the following claims and their equivalents.

What is claimed is:

1. An information processing apparatus comprising:
   an imaging apparatus that captures a moving image of a target person;
   at least one processor configured to act as:
      a receiving unit that receives the captured moving image;
      a detecting unit that detects a cue given by the target person;
      an associating unit that associates the cue, given by the target person and detected by the detecting unit, with the moving image so that the cue will be used to designate the moving image used for evaluating the target person; and
      a presenting unit that presents the moving image to an output device for display,
      wherein, in response to detection of one of start and end as the cue, if the cue indicates start, the detecting unit treats a point after a predetermined period after the start as end, and, if the cue indicates end, the detecting unit treats a point before a predetermined period before the end as start.

2. The information processing apparatus according to claim 1, wherein the associating unit extracts a moving image between start and end in accordance with the cue, or associates dates and times of the start and the end with the moving image.

3. The information processing apparatus according to claim 1, further comprising a controller that performs control to do one or a combination of reproducing a moving image between start and end in accordance with the cue, and regarding the moving image as a target to be analyzed.

4. The information processing apparatus according to claim 1, wherein the detecting unit detects one or a combination of an instruction from a terminal device operated by the target person as a cue, a predetermined sound generated by the target person as a cue, and a predetermined movement of the target person as a cue.

5. An information processing apparatus comprising:
   an imaging apparatus that captures a moving image of a target person;
   at least one processor configured to act as:
      a receiving unit that receives the captured moving image; a detecting unit that detects a cue given by the target person; an associating unit that associates the cue, given by the target person and detected by the detecting unit, with the moving image so that the cue will be used to designate the moving image used for evaluating the target person,
      wherein the detecting unit detects a second cue given by the target person;
      a notifying unit that, in response to detection of the second cue, notifies an evaluator so as to present a moving image after the second cue to the evaluator; and a presenting unit that presents the moving image to an output device for display.

6. A non-transitory computer readable medium storing a program causing a computer to execute a process, the process comprising:
   capturing a moving image of a target person;
   receiving the captured moving image;
   detecting a cue given by the target person;
   associating the detected cue, given by the target person, with the moving image so that the cue will be used to designate the moving image used for evaluating the target person;
   presenting the moving image to an output device for display; and
   in response to detection of one of start and end as the cue, if the cue indicates start, treating a point after a predetermined period after the start as end, and, if the cue indicates end, treating a point before a predetermined period before the end as start.

7. The information processing apparatus according to claim 5, wherein the associating unit extracts a moving image between start and end in accordance with the cue, or associates dates and times of the start and the end with the moving image.

8. The information processing apparatus according to claim 5, further comprising a controller that performs control to do one or a combination of reproducing a moving image between start and end in accordance with the cue, and regarding the moving image as a target to be analyzed.

9. The information processing apparatus according to claim 5, wherein the detecting unit detects one or a combination of an instruction from a terminal device operated by the target person as a cue, a predetermined sound generated by the target person as a cue, and a predetermined movement of the target person as a cue.

* * * * *